United States Patent
Chen

(10) Patent No.: US 7,426,342 B2
(45) Date of Patent: Sep. 16, 2008

(54) DIGITAL STILL CAMERA MODULE WITH LIGHT OPTIMIZATION MECHANISM

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 426 days.

(21) Appl. No.: 11/301,786

(22) Filed: Dec. 13, 2005

(65) Prior Publication Data

US 2006/0133794 A1 Jun. 22, 2006

(30) Foreign Application Priority Data

Dec. 17, 2004 (CN) .......... 2004 1 0077635

(51) Int. Cl.
*G03B 11/00* (2006.01)
*G02B 27/00* (2006.01)
*G03F 5/00* (2006.01)

(52) U.S. Cl. .............. 396/268; 396/505; 396/544; 348/340; 359/601; 359/893

(58) Field of Classification Search .......... 396/268, 396/276, 439, 505, 529, 544; 348/251, 252, 348/335, 340; 359/601, 893
See application file for complete search history.

(56) References Cited

U.S. PATENT DOCUMENTS

| | | | | |
|---|---|---|---|---|
| 2,356,694 A | * | 8/1944 | Potter et al. | 359/893 |
| 3,397,023 A | * | 8/1968 | Land | 359/241 |
| 3,981,565 A | * | 9/1976 | Karasawa | 359/234 |
| 5,489,940 A | * | 2/1996 | Richardson et al. | 348/315 |
| 7,289,251 B2 | * | 10/2007 | Kwon | 358/474 |
| 2006/0125950 A1 | * | 6/2006 | Chen | 348/345 |

* cited by examiner

*Primary Examiner*—W. B. Perkey

(57) ABSTRACT

A lens module includes a barrel (40), a plurality of lenses (42), and a light guide plate (60). The barrel is covered at one end thereof with a transparent board (50). The lenses are received in the barrel. The light guide plate, which is received in the barrel and is located in the light path of the lenses, includes a transparent sheet plate (61) and a plurality of high-transmittance areas (62) defined therein. The high-transmittance areas have a higher transmittance than that of the sheet plate, and the profile and the density of the high-transmittance areas increase with the increase of a distance between a center of the light guide plate and a center of a respective high-transmittance area.

15 Claims, 1 Drawing Sheet

DIGITAL STILL CAMERA MODULE WITH LIGHT OPTIMIZATION MECHANISM

BACKGROUND OF THE INVENTION

1. Field of the Invention

The present invention relates generally to a digital still camera module with a light optimization mechanism and, more particularly, to a small-sized, digital still camera module with a light optimization mechanism mounted in a portable electronic device, such as a mobile phone or a Personal Digital Assistant (PDA).

2. Discussion of the Related Art

Currently, digital still camera modules are in widespread use in a variety of portable electronic devices. Most portable electronic devices are becoming progressively more miniaturized over time, and digital still camera modules are correspondingly becoming smaller and smaller. For example, digital still camera modules are now widely available as a feature of a mobile phone. Nevertheless, in spite of the small size of a contemporary digital camera module, consumers still demand excellent imaging. The quality of the image provided is mainly dependent upon the optical elements of the digital still camera module.

A conventional digital camera module used in the mobile phone usually includes a plurality of lenses, an image sensor, and a focusing assembly for the purpose of zooming or auto-focusing. The image sensor receives an image formed by the lenses and converts the light signals of the image into electronic signals. The image formed on the image sensor by the lenses always has a higher light intensity at a center portion thereof and a lower light intensity at a peripheral portion thereof. Thus, the relative illumination of the image is poor. In order to get a better relative illumination, it is conventional to add to the size and/or number of the lens(es) to improve light intensity at the peripheral portion. However, it makes the digital module relatively much bigger and heavier.

What is needed, therefore, is a small-sized, digital still camera module with a light optimization mechanism which satisfies the needs for better, more uniform illumination of the image formed on the image sensor.

SUMMARY OF THE INVENTION

In a preferred embodiment, a lens module includes a barrel, a plurality of lenses, and a light guide plate. The barrel includes a transparent board covering one end thereof. The lenses are received in the barrel. The light guide board, which is received in the barrel and located in the light path of the lenses, includes a plurality of high-transmittance areas defined therewithin. The high-transmittance areas have a higher transmittance than that of the light guide plate, and the profile and the density of the high-transmittance areas increase with an increase of a distance between a center of the light guide plate and a center of a respective high-transmittance area.

Other advantages and novel features will become more apparent from the following detailed description of preferred embodiments when taken in conjunction with the accompanying drawings.

BRIEF DESCRIPTION OF THE DRAWING

Many aspects of a digital still camera module with a light optimization mechanism can be better understood with reference to the following drawings. The components in the drawings are not necessarily to scale, the emphasis instead being placed upon clearly illustrating the principles of the digital still camera module with light optimization mechanism. Moreover, in the drawings, like reference numerals designate corresponding parts throughout the several views.

DETAILED DESCRIPTION OF THE PREFERRED EMBODIMENT

Figure 1:
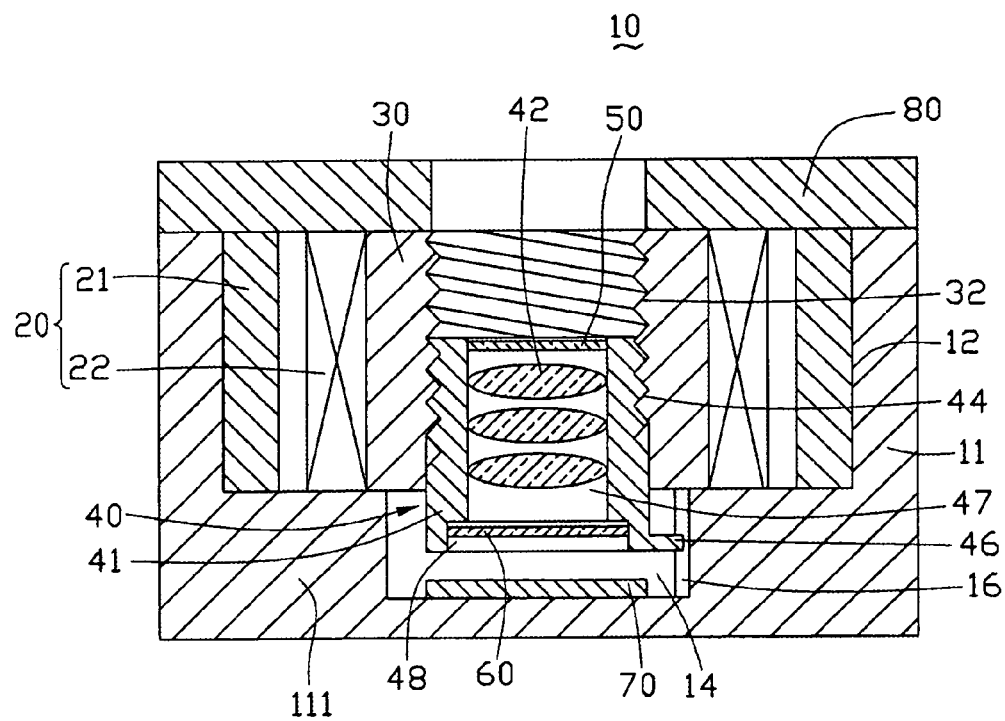
FIG. 1 is a schematic, cross-sectional view of a digital camera module with a light optimization mechanism according to a preferred embodiment.

Referring to FIG. 1, a digital camera module 10 with a light optimization mechanism, in accordance with a preferred embodiment, is shown. The digital camera module 10 includes a holder 11, a voice coil actuator 20, a sleeve 30, a lens module 40, a light guide plate 60, an image sensor 70, and a cover 80. While such a digital camera module 10 may be beneficially incorporated into multi-function portable electronic devices, it is also to be understood that it can be incorporated into more standard digital camera units, thus making such units more portable, also.

The holder 11 is a half-opening (i.e., open at only one end) hollow cylinder and defines a receiving cavity 12 therein. A holder bottom 111 is disposed at one end of the holder 10 and defines a receiving room or zone 14 in a central portion thereof. The receiving room 14 of the holder bottom 111 communicates with the receiving cavity 12 of the holder 11. A guiding slot 16 is defined in a direction of the axis of the holder 11 on the inner surface of the holder bottom 111. The guiding slot 16 communicates with the receiving room 14 of the holder bottom 111.

The voice coil actuator 20 is received by the receiving cavity 12 of the holder 11. The voice coil actuator 20 includes a magnet element 21 and a coil 22. The magnet element 21 advantageously adopts a four-pole-piece design and includes four permanent magnets, which are fixed to an inner surface of the holder 11. The magnet element 21 has a magnet field associated therewith. The coil 22, which is advantageously made of copper or brass, is wound around an outside of the sleeve 30. The coil 22 is located in the magnetic field of the magnet element 21. It is, however, to be understood that other materials and/or configurations can potentially be employed for the magnet element 21 and/or the coil 22 and still thereby yield a suitable voice coil actuator 20 for use within the digital still camera module 10.

The sleeve 30 is a hollow cylinder and has an internal thread 32 formed inside thereof. The sleeve 30 is axially located in the receiving cavity 12 of the holder 11, internally of the voice coil actuator 20.

The lens module 40 includes a barrel 41, a plurality of lenses 42, and the light guide plate 60. The barrel 41 is a hollow cylinder, one end of which is covered by a transparent board 50. The barrel 41 defines an external thread 44 over a portion thereof. The external thread 44 of the barrel 41 corresponds to the internal thread 32 of the sleeve 30, thereby providing an operable screw connection between the sleeve 30 and the barrel 41 to facilitate relative movement therebetween. A first cavity 47 is defined in the barrel 41, the first cavity 47 extending toward and thereby being near/proximate the transparent board 50. A second cavity 48 is defined in the barrel 41, proximate the end distal from the transparent board 50. The second cavity 48 is in communication with the first cavity 47, with the diameter of the second cavity 48 being larger than that of the first cavity 47. A guiding block 46, corresponding to the guiding slot 16 of the holder 11, protrudes from a surface outside the barrel 41 at the same end thereof at which the second cavity 48 is defined. The barrel 41 is placed in and engages with the sleeve 30, and the guiding block 46 couples with the guiding slot 16 of the bottom 111 of the holder 11.

At least one lens 42 is received in the first cavity 47 of the barrel 41. Each lens 42 is advantageously a plastic aspheric lens, in order to improve the quality of the image formed by the lens 42 and to reduce the weight of the digital lens module 10. However, it is to be understood that it could prove advantageous for one or more of the lenses 42 instead to be made of glass and/or to be of a different configuration (e.g., spherical, diffractive, wavy), depending, e.g., on the focusing qualities desired and on the cost a consumer is willing to bear. The transparent board 50, fixed to the end of the barrel 41 distal to the guiding block 46 and the second cavity 48, can protect the lens(es) 42 from external contamination and pollution. At least one surface of the transparent board 50 or the lens(es) 42 is beneficially coated with an infra-red cut coating (not shown), in order to reduce the amount of thermal-induced electronic noise by the infra-red light on the image sensor 70.

Figure 2:
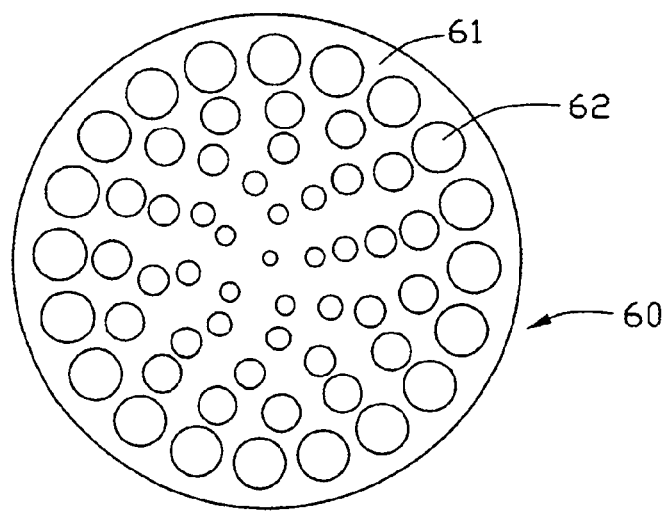
FIG. 2 is a schematic, plan view of a light guide plate of the digital camera module with a light optimization mechanism of FIG. 1.

The light guide plate 60 is received in the second cavity 48 of the barrel 41 in order to receive and optimize the light transmitted by the lens(es) 42. A center of the light guide plate 60 is aligned with an optical axis of the lens(es) 42. The diameter of the light guide plate 60 is about 5%~15% larger than the physical diameter of a given lens 42. The light guide plate 60 is substantially a transparent sheet plate 61 and is advantageously made of PMMA (Polymethyl Methacrylate) or PC (Polycarbonate) material. As shown in FIG. 2, a plurality of high-transmittance areas 62 is defined in the light guide plate 60. The high-transmittance areas 62 are, e.g., circular shape, square shape, or V-shape. In the preferred embodiment, there is nothing but air filled with the holes 62. However, a transparent material, which has a higher light transmittance than that of the transparent sheet plate 61, can be embedded in and thereby define such high-transmittance areas 62. The profile and the amount of the high-transmittance areas 62 appropriately increase with the increase of the distance between the center of the light guide plate 60 and the centers of the respective high-transmittance areas 62. Thus, the peripheral portion of the light guide plate 60 has a higher light transmittance than that of the central portion of the light guide plate 60.

The image sensor 70 can, e.g., be a CCD (Charge Coupled Device) image sensor or a CMOS (Complementary Metal-Oxide Semiconductor) image sensor. The image sensor 70 is mounted at a bottom of the receiving room 14. A center of the image senor 70 is aligned with the center of the light guide plate 60. The image sensor 70 receives the light transmitted by the light guide plate 60 and converts the light signals into electronic signals. The profile of the image sensor 70 is approximately 5%~10% larger than that of the light guide plate 60.

The cover 80 is mounted at the end of the holder 111 opposite and distal to the holder bottom 111. The cover 80 is either transparent or has a cover hole defined in the central portion thereof so that light beams can be transmitted therethrough. The sleeve 30 is incapable of moving axially since it is restricted by both the cover 80 and the holder bottom 111.

In assembling the digital still camera module 10, firstly, the image sensor 70 is mounted to the bottom of the receiving room 14 of the holder 11. Secondly, the magnet element 21 of the voice coil actuator 20 is fixed (e.g., mechanically, adhesively, and/or metallurgically) to the inner surface of the holder 11. Thirdly, the barrel 41, receiving the lens(es) 42 and light guide plate 60 therein, is inserted in and threadedly connected with the sleeve 30. Fourthly, the barrel 41, engaged with the sleeve 30, which is wound with the coil 22 on the outside, are located in the receiving cavity 12 of the holder 11. The guiding block 46 of the barrel 41 is correspondingly coupled with the guiding slot 16 of the holder bottom 111. Then, the opening of the holder 11 is covered by the cover 80. Alternatively, the coil 22 could be carried by the magnet element 21 such that the voice coil actuator 20 is a distinct assembly. In such an instance, the sleeve 30 would simply be inserted into the voice coil actuator 20 with the coil 22 then attached (e.g., mechanically, adhesively, and/or metallurgically), negating the need for a coil winding step. In either manner of mounting, the coil 22 is movably mounted relative to magnet element 21.

In use, the digital still camera module 10 is equipped within a portable electronic device, such as a mobile phone, and the coil 22 of the voice coil actuator 20 is electrically connected with a circuit board of the mobile phone for capturing electrical power. When the coil 22 is induced with a current flow, the coil 22 generates a magnetic field. Since the coil 22 is located in the magnetic field of the magnet element 21, the sleeve 30 (wound with the coil 22) rotates in reaction to the magnet element 21. The guiding block 46, coupled with the guiding slot 16, reacts to the internal thread 32 of the sleeve 30, thereby resulting in stable telescopic movement of the barrel 41 with the external thread 44 (i.e., under magnetic force, the sleeve 30 is forced to rotate, but the barrel 41 does not). Thus, the focusing purpose is achieved by changing the distance between the image sensor 70 and the lens(es) 42.

Though the light intensity of the light reaching the peripheral portion of light guide plate 60 is lower than that reaching the central portion of the light guide plate 60, the intensity of the light is made more uniform after transmitting through the light guide plate 60, as it favors light transmission at the periphery thereof. Thereby, the light intensity of the light received by the image sensor 70 is reasonably uniform, and the image formed by the digital still camera module 10 has a better relative illumination between the peripheral portion and the central portion thereof.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A lens module comprising:
   a barrel comprising a transparent board covered one end of the barrel;
   at least one lens received in the barrel; and
   a light guide plate received in the barrel and located in the light path of the at least one lens, the light guide plate comprising a transparent sheet plate and a plurality of high-transmittance areas defined within the transparent sheet plate, the high-transmittance areas having a higher transmittance than that of the transparent sheet plate, the profile and the density of the high-transmittance areas increasing with the increase of a distance between a center of the light guide plate and the respective centers of the high-transmittance areas.

2. The lens module as claimed in claim 1, wherein the shape of the high-transmittance areas is one of circular shape, square shape, and V-shape.

3. The lens module as claimed in claim 1, wherein the barrel defines a first cavity and a second cavity, the first cavity extending toward the end of the barrel covered by the transparent board, the second cavity communicating with the first cavity, the diameter of the first cavity being larger than that of the second cavity.

4. The lens module as claimed in claim 1, wherein the at least one lens is received in the first cavity and the light guide plate is received in the second cavity, the diameter of the light guide plate being about 5%~15% larger than that of the at least one lens.

5. A digital still camera module comprising:
a holder having a first end and a second end, the first end being open, the holder having a receiving cavity defined therein, the holder including a holder bottom at the second end thereof, the holder bottom having a receiving room defined therein, the receiving room communicating with the receiving cavity;
a lens module, received in the receiving cavity, comprising:
  a barrel having a transparent board covered one end thereof,
  at least one lens received in the barrel;
  a light guide plate received in the barrel and located in the light path of the at least one lens, the light guide plate comprising a transparent sheet plate and a plurality of high-transmittance areas defined within the transparent sheet plate, the high-transmittance areas having a higher transmittance than that of the transparent sheet plate, the profile and the density of the high-transmittance areas increasing with the increase of a distance between a center of the light guide plate and the respective centers of the high-transmittance areas; and
  an image sensor mounted in the receiving room of the holder bottom, the image sensor being configured for receiving and processing light signals transmitted through the light guide plate.

6. The digital still camera module as claimed in claim 5, wherein the barrel defines a first cavity and a second cavity, the first cavity extending toward the end of the barrel covered by the transparent board, the second cavity communicating with the first cavity, the diameter of the first cavity being larger than that of the second cavity.

7. The digital still camera module as claimed in claim 6, wherein the at least one lens is received in the first cavity, the light guide plate being received in the second cavity, the diameter of the light guide plate being about 5%~15% larger than that of the at least one lens.

8. The digital still camera module as claimed in claim 6, further comprising a voice coil actuator received in the holder, the voice coil actuator comprising a magnet element fixed to an inner surface of the holder and a coil located in a magnetic field generated by the magnet element.

9. The digital still camera module as claimed in claim 8, further comprising a sleeve internally attached to the coil, the sleeve having an internal thread inside.

10. The digital still camera module as claimed in claim 9, wherein the barrel has an external thread thereon, the external thread of the barrel corresponding to and engaging with the internal thread of the sleeve.

11. The digital still camera module as claimed in claim 5, wherein the holder bottom further defines a guiding slot axially in the inner surface thereof, and the guiding slot communicates with the receiving room of the holder bottom.

12. The digital still camera module as claimed in claim 11, wherein the barrel further comprises a guiding block protruding form a surface outside the barrel, the guiding block corresponds to and couples with the guiding slot of the holder bottom.

13. The digital still camera module as claimed in claim 5, wherein the shape of the high-transmittance areas is one of circular shape, square shape, and V-shape.

14. The digital still camera module as claimed in claim 5, further comprising a cover attached to the first end of the holder.

15. The digital still camera module as claimed in claim 5, further comprising a voice coil actuator and a sleeve mounted within the holder, the sleeve being configured for controlled movement under an influence of the voice coil actuator, the sleeve threadedly engaging the barrel, the barrel thereby being configured for displacement in reaction to a movement of the sleeve.

* * * * *